United States Patent
Bruschke et al.

(10) Patent No.: US 7,517,421 B2
(45) Date of Patent: Apr. 14, 2009

(54) METHOD FOR THE CONTINUOUS MANUFACTURE OF TUBULAR MEMBRANES

(75) Inventors: Hartmut E. A. Bruschke, Nussloch (DE); Wolfgang Schafer, Homburg (DE); Nicholas Patrick Wynn, Sarreguemines (DE); Frank-Klaus Marggraff, Homburg (DE)

(73) Assignee: Sulzer Chemtech GmbH, Ober-Morlen-Ziegenberg (DE)

( * ) Notice: Subject to any disclaimer, the term of this patent is extended or adjusted under 35 U.S.C. 154(b) by 509 days.

(21) Appl. No.: 10/531,743

(22) PCT Filed: Oct. 20, 2003

(86) PCT No.: PCT/EP03/11586

§ 371 (c)(1),
(2), (4) Date: Feb. 22, 2006

(87) PCT Pub. No.: WO2004/035183

PCT Pub. Date: Apr. 29, 2004

(65) Prior Publication Data

US 2006/0201611 A1    Sep. 14, 2006

(30) Foreign Application Priority Data

Oct. 18, 2002  (DE) ................ 102 48 750

(51) Int. Cl.
*B65H 81/00* (2006.01)
(52) U.S. Cl. ............ 156/190; 156/184; 156/191; 156/195
(58) Field of Classification Search .......... 156/184, 156/187, 188, 190, 191, 195
See application file for complete search history.

(56) References Cited

U.S. PATENT DOCUMENTS

| 3,195,427 A | 7/1965 | Adams |
|---|---|---|
| 3,294,617 A | 12/1966 | Way |
| 3,457,170 A * | 7/1969 | Havens ................ 210/641 |
| 3,533,883 A * | 10/1970 | Gartaganis et al. ........ 156/432 |
| 3,601,159 A | 8/1971 | Marks et al. |
| 3,715,036 A * | 2/1973 | Hamer ............... 210/321.87 |
| 3,746,591 A * | 7/1973 | Banfield ............... 156/191 |
| 4,337,281 A | 6/1982 | Boone |
| 5,156,740 A | 10/1992 | Brüschke |
| 5,582,949 A | 12/1996 | Bigelow et al. |
| 6,077,376 A * | 6/2000 | Katraro et al. ............ 156/195 |
| 2003/0178369 A1 | 9/2003 | Eguchi et al. |

FOREIGN PATENT DOCUMENTS

| CH | 548273 | | | 4/1974 |
|---|---|---|---|---|
| GB | 1604641 | | | 12/1981 |
| JP | S53-095373 | | | 8/1978 |
| JP | S54-009168 | | | 1/1979 |
| JP | S54-131577 | | | 10/1979 |
| JP | S54-138873 | | | 10/1979 |
| JP | S56-076206 | | | 6/1981 |
| JP | 57-154447 | A | * | 9/1982 |
| JP | S59-055716 | | | 3/1984 |
| JP | S61-244529 | | | 10/1986 |
| JP | 62-129108 | A | * | 6/1987 |
| JP | H08-324600 | | | 12/1996 |
| WO | WO 97/20684 | | | 6/1997 |
| WO | WO 02/06578 | | | 1/2002 |

* cited by examiner

*Primary Examiner*—Jeff H Aftergut
(74) *Attorney, Agent, or Firm*—RatnerPrestia

(57) ABSTRACT

Process for the continuous manufacture of tubular composite or multi-layer membranes comprising a porous sub layer (support layer), mainly determining the mechanical strength of the membrane, and adjacent to the support layer a second layer of a material of different chemical nature (separation layer), mainly determining the separation properties of the membrane, winding a respective flat sheet composite membrane lengthwise or spirally around a mandrel or shaft, into a tube or hose, the separating layer of the composite membrane facing to the inside of the tube or hose, gluing or welding the edges which may overlap or form a butt seam, and applying to said seam or overlapping area from the inside of the tube or hose a sealing material which can be solidified, and finally solidifying said sealing material.

13 Claims, No Drawings

METHOD FOR THE CONTINUOUS MANUFACTURE OF TUBULAR MEMBRANES

This application is a U.S. National Phase Application of PCT International Application PCT/EP2003/011586 filed Oct. 20, 2003.

The invention relates to a process for the continuous manufacture of tubular composite or multi-layer membranes formed as tubes or hoses, in the following related to as membrane tubes.

For any application a multitude of tubular membranes is assembled in a membrane module. General known types of such modules are the hollow fiber module, the capillary module, and the tubular module. The respective differences are due to the variation of the diameter of the tubular membranes. The diameters of hollow fiber membranes range between 30 to 100 micron, those of capillary membranes between 0.2 to 3 mm, and those for membrane tubes between 4 to 50 mm. In hollow fibers the transmembranen flux is directed from the outside to the inside, in capillary membranes from the outside to the inside as well as in reverse direction, and in tubular membranes mostly from the inside to the outside.

It is known in the art to manufacture membrane tubes with the active layer on the inside discontinuously by introducing a cone shaped body, the "bobby" into a vertically arranged tube. Above the "bobby" the respective polymer solution is poured from which the membrane will be formed. By moving the "bobby" through the tube a thin film of the polymer solution is distributed on the inner wall of the tube, said film being precipitated and solidified by means known in the art. The thus formed membrane can be removed from the tube and supported by any means known in the art. More often the membrane film is directly cast on a porous carrier material, either by a "bobby" or the polymer solution is distributed on the inner wall of the tube by passing a gas bubble through the tube. This method is known as "hydrocasting". The porous carrier material has to withstand all following steps.

It is further known in the art to manufacture membrane tubes with the active layer on the inside continuously by applying a polymer dope by means of an annular nozzle to a carrier material. According to U.S. Pat. No. 3,601,159 said carrier can be formed by winding several layers of suitable material around a mandrel. The nozzle is located at the end of said mandrel. Another possibility is given by forming a strip of the carrier material into a hose the overlap of which are then glued or welded together.

Capillary membranes are formed from polymer solutions by a so called "spinneret", a device comprising an annular nozzle around a central needle. Through an additional nozzle in said inner needle a precipitating agent for the polymer solution can be introduced into the inner volume of the capillary. Bundles of such capillaries are glued together at both ends and housed in a pressure vessel. It is important to obtain a crack- and stress-free sealing; furthermore the openings of the capillaries must not be blocked during cutting. The production of hollow fiber membranes is similar to the production of textile hollow fibers. They can be formed by wet spinning, dry spinning, or melt spinning processes. The center of the spinnerets is formed by a hollow needle, through which an inert gas or liquid is introduced in order to prevent collapsing of the fiber. During or following the spinning process the fibers may be stretched to the wanted diameter. Very fine hollow fiber membranes are changed from the outside, at larger diameters the feed flow can pass through the interior of the hollow fiber.

Depending on the conditions during the formation the active layer of the tubular membrane, responsible for the separation, will be continuously porous with a symmetric or asymmetric pore structure. In special cases a dense, essentially pore free structure can be formed.

It is a common property of the aforesaid membranes to comprise of one distinct material only, besides an additional carrier layer. Said distinct material may be inorganic or an organic polymer. Therefore these membranes are referred to as integral membranes. On to the carrier layer which may be a woven or non-woven fabric the integral membrane is applied, and the carrier improves the mechanical strength and handability of the membrane. The carrier layer shows relatively large pores which allow for an unhindered flow. Preferentially, as the other parts of the membrane, the carrier layer is resistant against chemicals and higher temperatures.

Tubular membranes comprising an integral membrane on a carrier layer can be formed by winding a narrow stripe of the carrier material around a mandrel thus forming a hose or tube, and butt welding or overlap welding the edges by heat or ultrasound. In a following step the hoses or tubes are coated, e.g. by a polymer solution. Preferentially the polymer solution is applied to the inner surface of the tube, as the latter may collapse when an outside pressure is applied. Therefore an opening exists at the end of the mandrel through which the polymer solution is applied to the inner surface of the tube. By immersion into a precipitation bath the membrane is then formed. Thus first a hose or tube is formed from the carrier material which is then uniformly coated on the inside. Any defects originating from imperfect welding shall be thus coated and sealed.

Following the above described continuous methods only integral or single-layer tubular membranes can be produced, as after coating of the carrier with the polymer solution and formation of the membrane any further coating can be applied only discontinuously to separate and distinct pieces of the membrane. Technically this is disadvantageous and uneconomical. The integral tubular membranes as described are mainly used in microfiltration, ultrafiltration and nanofiltration processes.

For the processes of reverse osmosis, pervaporation/vapor permeation, and gas separation preferentially multi-layer membranes are utilized, which comprise at least two layers of different chemical composition, in addition to the carrier layer. In general such composite membranes comprise a first porous sublayer which determines mainly the mechanical strength of the membrane (support layer), and adjacent to the sublayer a second layer of a chemically different material which mainly determines the separation characteristics of the membrane (separating layer). The separating layer may be microporous or dense and pore-free. Membranes for Reverse Osmosis in general comprise a microporous separating layer, having pores with diameters in the range between 10 to 1000 Å. Membranes used in Pervaporation/Vapor Permeation and Gas Permeation may still have a certain number of pores with diameters of 10 Å or below, nevertheless they are referred to as dense or pore-free. Technically the dense or pore-free membranes are distinguished from the microporous ones as they separate according to the Solution-Diffusion-Mechanism. Examples of such useful dense separating layers are disclosed in EP-B-0 096 339, e.g. made from polyvinylalcohol or polyvinylalcohol copolymers. By means of an aqueous solution of said polymer, which may contain additional cross-linking agents for polyvinylalcohol a thin layer is applied to a support layer, which is then subjected to a drying and heat treatment step in order to cross-link the polyvinylalcohol. To those skilled in the art further composite membranes are known, useful for the processes mentioned above.

In principle tubular membranes can be formed from flat sheet composite membranes by the above described method. However, the glue lines and especially welding seams of membrane tubes thus formed will show defects and leakages as it is possible to weld at least two layers of different materials (separating layer, support layer and eventually carrier layer) uniformly and defect free. It is the task of the present invention to present a solution to this problem.

The present invention thus relates to a process for the continuous production of composite membrane tubes, comprising a porous sublayer (support layer), mainly determining the mechanical strength of the membrane, and adjacent to that a second layer of a material of different chemical nature, said second layer mainly determining the separation properties of the membrane (separating layer), said process comprising winding a respective flat sheet composite membrane lengthwise or spirally into a tubular form, the separating layer of said membrane facing to the inside, welding or gluing the edges of said membrane together, either overlapping or by butt welding, and applying on the inside of said butt seam or overlapping area a strip of a sealing material which can be solidified and finally solidifying said sealing material.

The support layer and the separating layer of a composite membrane are made from materials of different chemical nature. Such membranes which are made and used as flat sheets for the separation of liquid mixtures by Pervaporation/Vapor Permeation or Gas Separation are disclosed by e.g. EP-B0 096 339. For the method according to the present invention flat sheet composite membranes are preferred comprising an additional carrier layer of a woven or non-woven fabric.

The membrane tubes according to the present invention have diameters in the range between 4 to 50 mm, preferentially between 8 to 30 mm, whereby diameters between 12 to 25 mm have proven to be advantageous.

Preferentially the membrane tube is formed by spirally winding a flat sheet composite membrane around a mandrel or shaft, whereby the winding may overlap or form butt seams. In the final membrane tube the separating layer forms the inside surface. In a preferred arrangement comprising a carrier layer the order of the layer from the inside to the outside of the membrane tube is as follows: Separating layer, support, layer, carrier layer. Welding is effected by e.g. ultrasound or heat. When butt welding is preferred an additional strip of material is applied to the seam which can be efficiently be welded or glued to the material with which it is in contact, and said material is then glued or welded to the material of the membrane. When a membrane comprising a carrier layer is processed, the carrier layer made e.g. from a woven or non-woven fabric, said additional strip of material is preferentially chosen from the same material as that of the carrier layer. Hereby it is of no concern whether the other layers are totally welded or glued, as any defects will be sealed by the application and solidification of the later applied sealing material. The width of said strip of material is chosen in such a way that a permanent fixation of the butt weld seam is effected, e.g. 2 to 10 mm, or 2 or 4 mm.

In a next step a stripe of a sealing material which can be solidified is applied from the inside of the membrane tube to the butt seam or the area of overlapping, respectively, and solidified. The sealing material, preferentially a polymer, has to exhibit a good adhesion to the separating layer of the membrane, its thermal and chemical resistance have to be similar to that of the separating layer. Thus it is preferred to use the polymer of the separating layer as the sealing polymer.

The sealing polymer can then be treated and cross-linked by the same means as the separating polymer of the flat sheet membrane. Examples of useful sealing polymers are polyvinylalcohol, dissolved in water, for polyvinylalcohol separating layers; polyurethane, dissolved in ketones or ester, for polyurethane separating layers; and siloxanes, dissolved in ketones, for siloxane separating layers.

The sealing material is applied from the inside of the membrane tube onto the butt seam or the area of overlapping by means of a nozzle, coupled to a respective control of the speed by which the membrane tube is formed. The application of the sealing material is controlled in order to coat and seat the butt seam or the area of overlapping in a width of 1 to 2 mm, or wider, if required. Preferentially said nozzle is located on the mandrel or shaft around which the membrane tube is formed and welded or glued. Thus formation of the membrane tube, welding or gluing and application of the sealing materials is effected in a single operation.

In order to improve its mechanical stability one or more drainage layers, in addition to the carrier layer can be applied to the membrane tube, as is known in the art.

According to the process of the present invention membrane tubes can be manufacture from flat sheet composite membranes, the membrane tubes being free of defects and exhibiting the same selectivity as the respective flat sheet membrane.

The invention claimed is:

1. A process for the continuous production of composite or multi-layer membrane tubes, the multi-layer membrane tubes comprising a porous support layer, mainly determining the mechanical strength of the membrane, and, adjacent to said porous support layer, a second layer of a material of different chemical nature, said second layer mainly determining the separation properties of the membrane (separating layer), said process comprising the steps of:

winding a respective flat sheet composite membrane lengthwise or spirally into a tubular form and forming a membrane tube, the separating layer of said membrane facing to the inside, welding or gluing the edges of said membrane together, either in an overlapping or abutting fashion, then applying from the inside onto said butt seam or overlapping area a strip of a sealing material which can be solidified, and finally solidifying said sealing material.

2. The process according to claim 1 in which the flat sheet composite membrane comprises an additional carrier layer made from woven or non-woven fabric.

3. The process according to claim 1 in which the membrane tube is formed by winding said flat sheet composite membrane as a tape spirally around a mandrel or shaft.

4. The process according to claim 1 in which the sealing material the same polymer from which the separating layer of the membrane is made.

5. The process according to claim 3 in which the sealing material is applied by means of nozzle.

6. The process according to claim 5 in which said nozzle for the application of said sealing material is located on said mandrel or shaft around which said flat sheet composite membrane strip is formed into a membrane tube, and in which the steps of forming the membrane tube, gluing or welding the edges, application of the sealing material on the welding seam or overlapping area are performed in a single operation.

7. The process according to claim 1 additionally comprising applying to said membrane tube, in addition to the carrier layer, one or more porous drainage layers.

8. The process according to claim 2 in which the membrane tube is formed by winding said flat sheet composite membrane as a tape spirally around a mandrel or shaft.

9. The process according to claim 8 in which the sealing material the same polymer from which the separating layer of the membrane is made.

10. The process according to claim 8 in which the sealing material is applied by means of nozzle.

11. The process according to claim 10 in which said nozzle for the application of said sealing material is located on said mandrel or shaft around which said flat sheet composite membrane strip is formed into a membrane tube, and in which the steps of forming the membrane tube, gluing or welding the edges, application of the sealing material on the welding seam or overlapping area are performed in a single operation.

12. The process according to claim 11 additionally comprising applying to said membrane tube, in addition to the carrier layer, one or more porous drainage layers.

13. The process according to claim 2 additionally comprising applying to said membrane tube, in addition to the carrier layer, one or more porous drainage layers.

* * * * *